(12) United States Patent
Koh

(10) Patent No.: US 11,718,152 B2
(45) Date of Patent: Aug. 8, 2023

(54) SYSTEM AND METHOD FOR CONTROLLING TEMPERATURE OF SEAT

(71) Applicant: HYUNDAI TRANSYS INCORPORATED, Seosan-si (KR)

(72) Inventor: Sang Kyung Koh, Yongin-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 56 days.

(21) Appl. No.: 17/398,377

(22) Filed: Aug. 10, 2021

(65) Prior Publication Data
US 2022/0118819 A1 Apr. 21, 2022

(30) Foreign Application Priority Data
Oct. 19, 2020 (KR) .......................... 10-2020-0135372

(51) Int. Cl.
*B60H 1/00* (2006.01)
*B60N 2/56* (2006.01)
*B60N 2/00* (2006.01)

(52) U.S. Cl.
CPC ..... *B60H 1/00742* (2013.01); *B60H 1/00821* (2013.01); *B60H 1/00878* (2013.01); *B60H 1/00971* (2013.01); *B60N 2/002* (2013.01); *B60N 2/5621* (2013.01); *B60N 2/5678* (2013.01); *B60Y 2400/302* (2013.01); *B60Y 2400/3015* (2013.01)

(58) Field of Classification Search
CPC ............ B60H 1/00742; B60H 1/00821; B60H 1/00878; B60H 1/00971; B60H 1/00285; B60N 2/002; B60N 2/5621; B60N 2/5678; B60Y 2400/3015; B60Y 2400/302
See application file for complete search history.

(56) References Cited

U.S. PATENT DOCUMENTS

| 2018/0001734 A1* | 1/2018 | Faust ................. B60H 1/00742 |
| 2018/0251008 A1* | 9/2018 | Androulakis ........ B60N 2/5621 |
| 2021/0316711 A1* | 10/2021 | Wu ....................... B60N 2/5685 |

FOREIGN PATENT DOCUMENTS

| KR | 10-1997-0036372 A | 7/1997 |
| KR | 10-2006-0093184 A | 8/2006 |
| KR | 10-2013-0136060 A | 12/2013 |
| KR | 10-2019-0093790 A | 8/2019 |

* cited by examiner

*Primary Examiner* — Marc E Norman
(74) *Attorney, Agent, or Firm* — NKL Law; Jae Youn Kim

(57) ABSTRACT

Provided are a seat temperature control system and a control method thereof comprising a sensor unit collecting integrated information including vehicle information on vehicle environment, seat information on a state of a seat, and occupant information on a state of an occupant; an air conditioning device regulating airflow volume and temperature of an indoor space or a seat of the vehicle; and a control unit having a prioritizing criterion on the priority among a plurality of pieces of integrated information, prioritizing the plurality of pieces of integrated information according to the prioritizing criterion, setting target temperature of the output from the seat or the air conditioning device according to the plurality of prioritized pieces of integrated information, and controlling the air conditioning device in order for the temperature of the output from the seat or the air conditioning device to reach the target temperature.

10 Claims, 2 Drawing Sheets

SYSTEM AND METHOD FOR CONTROLLING TEMPERATURE OF SEAT

CROSS REFERENCE TO RELATED APPLICATION

The present application claims priority to Korean Patent Application No. 10-2020-0135372, filed Oct. 19, 2020, the entire contents of which is incorporated herein for all purposes by this reference.

BACKGROUND OF THE INVENTION

Field of the Invention

The present invention relates to a system and a method for controlling a temperature of a seat by collecting information on a vehicle, a seat, or an occupant, prioritizing respective pieces of information, setting target temperature according to the priority, and controlling an air conditioning device in order for the temperature of the output from the seat or the air conditioning device to reach the target temperature.

Description of the Related Art

The purpose of vehicle air conditioning is to create a comfortable environment for an occupant by heating, ventilating, or cooling the interior of a vehicle. Recently, many developments have been made not just for indoor air conditioning through a heater or an air conditioner but for seat air conditioning using heating wires or cooling technology.

However, the current air conditioning system widely uses a manual control by which the occupant sets any temperature or turns a switch on and off, and the occupant sitting on a seat does not even feel any particular effect of the indoor air conditioning in parts the air conditioning device fails to reach. In addition, the seat air conditioning serves to complement the indoor air conditioning rather than provide a temperature tailored for the occupant so that a particular temperature is uniformly provided to all occupants in many cases.

Therefore, there is a need to develop a smarter seat temperature control that may automatically set the temperature according to various vehicle environments and control individualized air conditioning for each occupant through the vehicle indoor or seat air conditioning.

The matters described as the background technology of the present invention are only for a better understanding of the background of the present invention and should not be taken as acknowledging that they correspond to the related art already known to those of ordinary skills in the art.

SUMMARY OF THE INVENTION

The present invention is proposed to solve such problems and aims to provide a system and a method for controlling a temperature of a seat by collecting information on a vehicle, the seat, or an occupant, prioritizing respective pieces of information, setting target temperature according to the priority, and controlling an air conditioning device in order for the temperature of the output from the seat or the air conditioning device to reach the target temperature so that the priority is stored and managed for each occupant and the temperature is tailored for each occupant.

In order to achieve the object, the seat temperature control system according to the present invention includes a sensor unit collecting integrated information including vehicle information on vehicle environment, seat information on a state of a seat, or occupant information on a state of an occupant; an air conditioning device regulating airflow volume and temperature of an indoor space or a seat of the vehicle; and a control unit having a prioritizing criterion on the priority among a plurality of pieces of integrated information, prioritizing the plurality of pieces of integrated information according to the prioritizing criterion, setting target temperature of the output from the seat or the air conditioning device according to the plurality of prioritized pieces of integrated information, and controlling the air conditioning device in order for the temperature of the output from the seat or the air conditioning device to reach the target temperature.

An identification unit identifying an occupant by a smart key, vehicle memory, or a method including fingerprint recognition or face recognition may be further included, and a sensor unit may collect integrated information when the occupant is identified by the identification unit.

The control unit may database the identified occupants and the plurality of prioritized pieces of integrated information determined for each occupant and, if the occupants are the same, set the target temperature of the output from the seat or the air conditioning device according to the same plurality of prioritized pieces of information.

The sensor unit may collect integrated information through a sensor including a temperature sensor, a humidity sensor, an illumination sensor, a thermal imaging camera, or a wearable sensor.

The prioritizing criterion may include the accuracy of the integrated information or the effect the integrated information exerts on an occupant and the control unit may prioritize the plurality of pieces of information according to the accuracy of the integrated information or the effect the integrated information exerts on the occupant.

When the prioritizing criterion is changed, the control unit may update the priority of the plurality of pieces of information according to the changed prioritizing criterion.

The air conditioning device may be provided in the indoor space or the seat of the vehicle and perform air conditioning including cooling, heating, or ventilation.

In order to achieve the object described above, the seat temperature control method includes collecting integrated information including vehicle information on vehicle environment, seat information on a state of a seat, or occupant information on a state of an occupant; prioritizing a plurality of pieces of information according to a prioritizing criterion on the priority among a plurality of pieces of information; setting target temperature of the output from a seat or an air conditioning device according to the plurality of prioritized pieces of information; and controlling the air conditioning device regulating airflow volume and temperature of the indoor space or the seat of the vehicle in order for the temperature of the output from the seat or the indoor air conditioning device to reach the target temperature.

Identifying an occupant by a smart key, vehicle memory, or a method including fingerprint recognition or face recognition may be further included before integrated information is collected.

When the prioritizing criterion is changed, updating the priority of the plurality of pieces of information according to the changed prioritizing criterion after the prioritization may be included.

In the system and the method for controlling a temperature of a seat according to the present invention, information on a vehicle, a seat, or an occupant may be collected, priority among respective pieces of information may be determined, the temperature may be set according to the priority, and the air conditioning device may be controlled in order for the temperature of the output from the seat or air conditioning device to reach the target temperature so that the priority may be stored and managed for each occupant and seat temperature control tailored for each occupant may be performed.

DETAILED DESCRIPTION OF THE INVENTION

Figure 1:
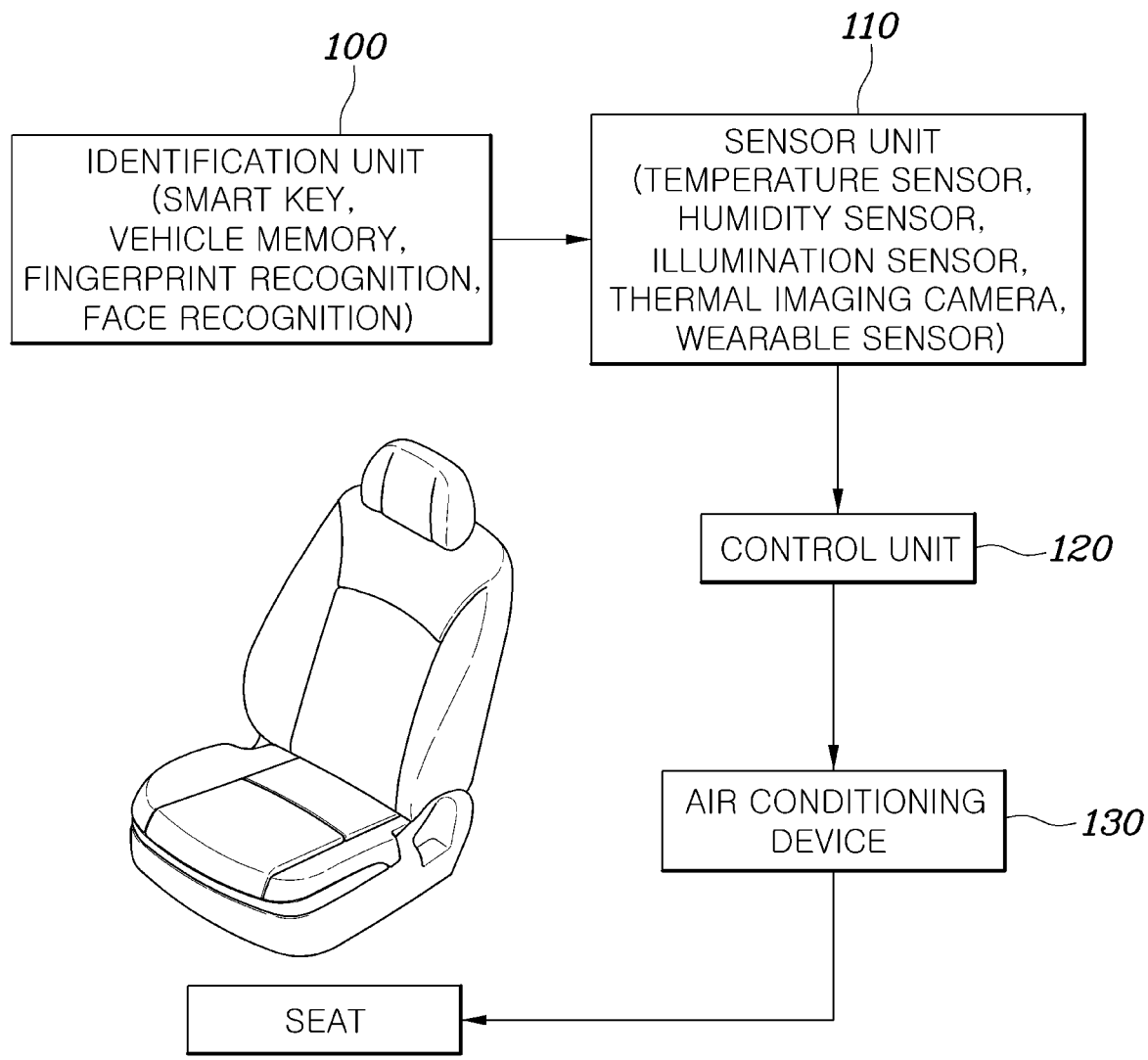
FIG. 1 is a view showing a seat temperature control system according to an embodiment of the present invention.
Figure 2:
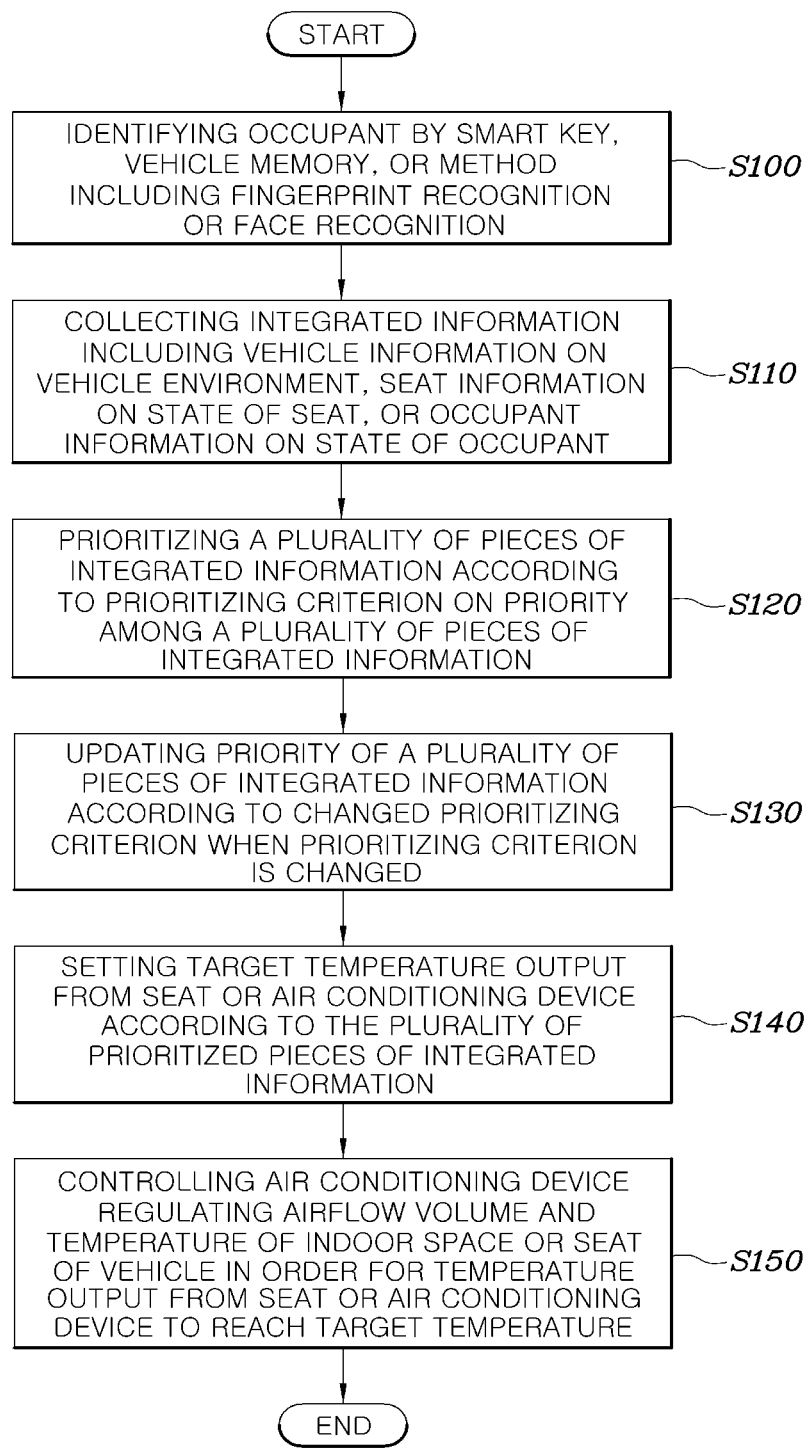
FIG. 2 is a flowchart of a seat temperature control method according to an embodiment of the present invention.

FIG. 1 is a view showing a seat temperature control system according to an embodiment of the present invention. FIG. 2 is a flowchart of a seat temperature control method according to an embodiment of the present invention.

FIG. 1 is a view showing a seat temperature control system according to an embodiment of the present invention. The seat temperature control system according to the embodiment of the present invention includes a sensor unit 110 collecting integrated information including vehicle information on vehicle environment, seat information on a state of a seat, or occupant information on a state of an occupant; an air conditioning device 130 regulating airflow volume and temperature of an indoor space or a seat of the vehicle; and a control unit 120 having a prioritizing criterion on the priority among a plurality of pieces of integrated information, prioritizing the plurality of pieces of integrated information according to the prioritizing criterion, setting target temperature of the output from the seat or the air conditioning device according to the plurality of prioritized pieces of information, and controlling the air conditioning device 130 in order for the temperature of the output from the seat or the air conditioning device to reach the target temperature. Here, the control unit 120 can be a computing component, which can be one or more processors, one or more circuits, or an equivalent thereof, but not limited thereto.

In the existing indoor air conditioning or seat air conditioning system in a vehicle, an occupant operates an air conditioning device using a switch, etc., and the air conditioning is performed at a fixed temperature depending on the set temperature. However, in such a system, air conditioning is performed only at a fixed temperature. Even in auto mode, air conditioning is performed only at the temperature as determined by the air conditioning device with no regard to the state of the occupant, and, in general, the temperature is determined by the indoor air conditioning device alone so that efficient air conditioning may not be done in small parts such as a seating surface where an occupant is seated. Therefore, to make up for such a deficiency, in the seat temperature control system according to an embodiment of the present invention, the sensor unit 110 first determines the priority in consideration of the vehicle environment, the state of the seat, and the state of the occupant, sets a target temperature according to the priority, and performs the vehicle air conditioning or seat air conditioning in order that the target temperature is reached, so that vehicle and seat temperature tailored to the states of the vehicle and the occupant may be provided.

In addition, the seat temperature control system according to an embodiment of the present invention may further include an identification unit 100 for identifying an occupant. The identification unit 100 can include a smart key, vehicle memory, fingerprint recognition reader, or face recognition reader, and the sensor unit 110 may collect integrated information when the occupant is identified by the identification unit 100. If unidentified, the occupant is registered as a new user. Also, in the seat temperature control system according to an embodiment of the present invention, the control unit 120 may database the identified occupants and the priority of a plurality of pieces of integrated information determined for each occupant and, when the occupants are the same, may set the target temperature of the output from the seat or the air conditioning device according to the same plurality of prioritized pieces of integrated information.

Specifically, when an occupant gets in a vehicle, the identification unit 100 identifies the occupant by a smart key, vehicle memory, or a method including fingerprint recognition or face recognition. Whether the occupant is seated is determined so as to get preparation under way for controlling the air conditioning device. Since each occupant has a different preference for temperature or air conditioning method, the occupant, once seated, is identified and the priority of integrated information on the occupant is stored and managed, so that, even when the same occupant gets in the same vehicle numerous times, the air conditioning priority may be determined in the same way and the air conditioning may be performed for the occupant at the temperature, or by the air conditioning method, preferred by the occupant even without particular manipulation on the part of the occupant. If the occupant engages in particular manipulation on the temperatures or the air conditioning method subsequently, this is fed to the control unit 120 to update the priority, and the control unit 120 may set the target temperature of the output from the seat or the air conditioning device according to the plurality of updated prioritized pieces of information.

Meanwhile, in the seat temperature control system according to an embodiment of the present invention, the sensor unit 120 may collect integrated information through sensors including a temperature sensor, a humidity sensor, an illumination sensor, a thermal imaging camera, or a wearable sensor. Specifically, the temperature of the seat surface of the seat may be sensed with a negative temperature coefficient sensor (NTC sensor), indoor or outdoor temperature, humidity, and illumination may be sensed with the temperature sensor, humidity sensor, and illumination sensor, and the body temperature of the occupant may be directly sensed with the thermal imaging camera. In addition, the wearable sensor worn by the occupant may be employed to get biological information of the occupant such as an activity level, a pulse rate, blood sugar, electrocardiogram, etc., determine the effect the air conditioning device exerts on the occupant, and set the target temperature of the output from the seat or the air conditioning device.

In addition, in the seat temperature control system according to an embodiment of the present invention, the prioritizing criterion may include the accuracy of the integrated information or the effect the integrated information exerts on the occupant, and the control unit 120 may determine the priority among a plurality of pieces of information according to the accuracy of the integrated information or the effect the integrated information exerts on the occupant. For example, if the collecting situation is poor or harsh or if a sensor malfunctions when the information on the state of the seat or the state of the occupant is collected, the accuracy or precision of diverse integrated information sensed by the sensor unit 110 may be impaired. In such a case, the accuracy or precision of the diverse integrated information sensed by the sensor unit 110 may be evaluated and the integrated information having high accuracy or precision may first be reflected in setting the target temperature of the output from the seat or the air conditioning device.

Meanwhile, the effect the integrated information exerts on the occupant will also act as an important element in prioritization. Specifically, scores will be calculated according to the effect of the information collected by the sensor unit 110 on the vehicle, seat, and occupant, the sensed information essential to the seat temperature control is selected by the calculated scores, and the target temperature of the output from the seat or the air conditioning device may be set to reflect the selected sensed information first.

For example, since the seating surface of a seat is a part in contact with the body of an occupant from the point of an ordinary occupant, the seat temperature control system may first consider the temperature of the seating surface of the seat to speed up the seat air conditioning. However, a certain occupant may want indoor air conditioning rather than the seat air conditioning, in which case the air conditioning may start with seat air conditioning first so that the target temperature of the seat may be reached fast for the occupant and subsequently proceed to the stepped-up indoor air conditioning to maintain comfortable indoor temperature. Since the target temperature or preferred air conditioning method is different for each occupant, the air conditioning tailored for each occupant may be provided by setting the target temperature of the output from the seat or the air conditioning device according to different priorities for each occupant determined through the integrated information.

In addition, in the seat temperature control system, when the prioritizing criterion is changed, the control unit 120 may update the priority of the plurality of pieces of integrated information according to the changed prioritizing criterion. When the vehicle environment, the state of the seat, and the state of the occupant changes, or when the prioritizing criterion is changed by the manipulation of the occupant, the control unit 120 immediately accommodates the change and sets the target temperature of the output from the seat or the air conditioning device according to the updated priority.

Meanwhile, in the seat temperature control system according to an embodiment of the present invention, the air conditioning device 130 may be provided in the indoor space or the seat of the vehicle and perform air conditioning including cooling, heating, or ventilation. In general, the air conditioning device 130 refers to an indoor air conditioning device such as a heater, an air conditioner, or a ventilator provided in the interior of a vehicle a seat air conditioning device such as a heated seat or a ventilated seat. In many cases of the existing indoor air conditioning device of a vehicle, an occupant sets temperature and the air conditioning is performed only at that temperature, or the indoor air conditioning device and the seat air conditioning device are separately controlled and do not cooperate with each other. Therefore, the seat temperature control system according to an embodiment of the present invention uses both the indoor air conditioning and the seat air conditioning according to the vehicle environment, the state of a seat, and the state of the occupant as much as needed so that the air conditioning efficiency may be maximized.

FIG. 2 is a flowchart of a seat temperature control method according to an embodiment of the present invention. The seat temperature control method according to the embodiment of the present invention includes collecting integrated information including vehicle information on vehicle environment, seat information on a state of a seat, or occupant information on a state of an occupant (S110); prioritizing a plurality of pieces of integrated information according to a prioritizing criterion on the priority among the plurality of pieces of integrated information (S120); setting target temperature of an output from a seat or an air conditioning device according to the plurality of prioritized pieces of information (S140); and controlling the air conditioning device regulating airflow volume and temperature in the indoor space or the seat of the vehicle in order for the temperature of the output from the seat or the air conditioning device to reach the target temperature (S150).

In addition, the seat temperature control method according to an embodiment of the present invention may further include identifying an occupant by a smart key, vehicle memory, or a method including fingerprint recognition or face recognition (S100) before integrated information is collected (S110).

Meanwhile, when the prioritizing criterion is changed, the seat temperature control method according to an embodiment of the present invention may include updating the priority of a plurality of pieces of integrated information according to the changed priority (S130) after the prioritization (S120).

Specific embodiments of the present invention are illustrated and described, but it will be self-evident to those with common knowledge in the related art that the present invention may be improved and modified in various ways within the scope not departing from the technical spirit of the present invention provided by the patent claims below.

DESCRIPTION OF THE REFERENCE NUMERALS

| 100: identification unit | 110: sensor unit |
|---|---|
| 120: control unit | 130: air conditioning device |

What is claimed is:

1. A seat temperature control system comprising:
   sensors collecting a plurality of pieces of integrated information including vehicle information on a vehicle environment, seat information on a state of a seat, or occupant information on a state of an occupant;
   an air conditioning device regulating an airflow volume and temperature in an indoor space or the seat of a vehicle; and
   a controller having a prioritizing criterion on priority among the plurality of pieces of integrated information, prioritizing the plurality of pieces of integrated information, setting a target temperature of an output from the seat or the air conditioning device according to the prioritized plurality of pieces of integrated information, and controlling the air conditioning device in order for a temperature of the output from the seat or the air conditioning device to reach the target temperature,
   wherein the prioritizing criterion includes an accuracy of the integrated information, and
   wherein the controller determines the priority among the plurality of pieces of integrated information according to the accuracy of the integrated information.

2. The seat temperature control system according to claim 1, further comprising an identification unit including a smart key, vehicle memory, fingerprint recognition reader, or face recognition reader for identifying the occupant, wherein the sensors collect the plurality pieces of integrated information when the occupant is identified by the identification unit.

3. The seat temperature control system according to claim 2, wherein the controller databases the identified occupant and the prioritized plurality of pieces of integrated information determined for the occupant, and when the occupant is identified, sets the target temperature of the output from the seat or the air conditioning device according to the prioritized plurality of pieces of integrated information.

4. The seat temperature control system according to claim 1, wherein the sensors include a temperature sensor, a humidity sensor, an illumination sensor, a thermal imaging camera, or a wearable sensor.

5. The seat temperature control system according to claim 1, wherein the prioritizing criterion further includes an effect the integrated information exerts on the occupant, and
the controller determines the priority among the plurality of pieces of integrated information according to the effect the integrated information exerts on the occupant.

6. The seat temperature control system according to claim 1, wherein, when the prioritizing criterion is changed, the controller updates the priority of the plurality of pieces of integrated information according to the changed prioritizing criterion.

7. The seat temperature control system according to claim 1, wherein the air conditioning device is provided in the indoor space or the seat of the vehicle and performs air conditioning including heating, cooling, or ventilation.

8. A seat temperature control method comprising:
collecting a plurality of pieces of integrated information including vehicle information on a vehicle environment, seat information on a state of a seat, or occupant information on a state of an occupant;
prioritizing the plurality of pieces of integrated information according to a prioritizing criterion on priority among the plurality of pieces of integrated information;
setting a target temperature of an output from a seat or an air conditioning device according to the prioritized plurality of pieces of information; and
controlling the air conditioning device regulating an airflow volume and temperature of an indoor space or the seat of a vehicle in order for a temperature of the output from the seat or the air conditioning device to reach the target temperature, using a controller,
wherein the prioritizing criterion includes an accuracy of the integrated information, and
wherein the controller determines the priority among the plurality of pieces of integrated information according to the accuracy of the integrated information.

9. The seat temperature control method according to claim 8, further comprising identifying the occupant by a smart key, vehicle memory, or a method including fingerprint recognition or face recognition.

10. The seat temperature control method according to claim 8, comprising updating the priority of the plurality of pieces of information according to a changed prioritizing criterion when the prioritizing criterion is changed.

* * * * *